US012722430B2

(12) United States Patent
Walton

(10) Patent No.: US 12,722,430 B2
(45) Date of Patent: Sep. 1, 2026

(54) TRAILER DOLLY APPARATUS

(71) Applicant: Randal D. Walton, Chubbuck, ID (US)

(72) Inventor: Randal D. Walton, Chubbuck, ID (US)

( * ) Notice: Subject to any disclaimer, the term of this patent is extended or adjusted under 35 U.S.C. 154(b) by 531 days.

(21) Appl. No.: 18/202,034

(22) Filed: May 25, 2023

(65) Prior Publication Data

US 2023/0294463 A1 Sep. 21, 2023

Related U.S. Application Data

(63) Continuation-in-part of application No. 16/941,110, filed on Sep. 28, 2020, now Pat. No. 11,691,680.

(51) Int. Cl.
*B60D 1/07* (2006.01)
*B60D 1/66* (2006.01)

(52) U.S. Cl.
CPC ............. *B60D 1/075* (2013.01); *B60D 1/665* (2013.01)

(58) Field of Classification Search
CPC .... B60D 1/075; B60D 1/665; B62D 53/0864; B62D 63/065
See application file for complete search history.

(56) References Cited

U.S. PATENT DOCUMENTS 3,476,405 A * 11/1969 Cunha ....................... B60P 7/13 280/80.1
4,759,563 A * 7/1988 Nash .................. B62D 53/0807 414/362
4,856,804 A * 8/1989 Nash .................. B62D 53/0807 280/441
5,098,115 A * 3/1992 Haire ................. B62D 53/0864 280/901
5,338,050 A * 8/1994 Haire ................. B62D 53/0864 280/476.1
5,348,332 A * 9/1994 Hamilton ................. B60D 3/00 280/416.2
5,407,221 A * 4/1995 Haire ................. B62D 53/0864 280/901
5,860,670 A * 1/1999 Aubin .................... B60D 1/167 280/476.1
5,924,716 A * 7/1999 Burkhart, Sr. ..... B62D 53/0864 280/476.1
6,056,309 A * 5/2000 Brown ..................... B60D 1/07 280/447
6,273,447 B1 * 8/2001 Vande Berg ........... B60D 1/075 280/476.1
6,290,248 B1 * 9/2001 Yrigoyen ................. B60D 1/07 280/460.1
6,733,028 B2 * 5/2004 Teeple ..................... B60D 1/06 280/476.1
6,820,887 B1 * 11/2004 Riggle .............. B62D 53/0864 280/490.1

(Continued)

*Primary Examiner* — Valentin Neacsu
*Assistant Examiner* — Michael R Stabley

(57) ABSTRACT

A load-bearing trailer dolly which connects a tongue-type boat, utility or other trailer to a towing tandem trailer and bears weight from the trailer during towing. The trailer dolly is characterized by an axle mounted on a pair of wheels. A dolly frame height-adjustable trailer hitch that receives a primary or a secondary trailer. The adjustable hitch on the trailer dolly allows horizontal leveling. A shock-absorbing spring is fitted between the axle mount and the dolly frame for cushioning the dolly frame on the axle mount as the trailer is towed behind the towing tandem trailer.

13 Claims, 17 Drawing Sheets

(56) References Cited

U.S. PATENT DOCUMENTS

| | | | | | |
|---|---|---|---|---|---|
| 7,823,902 | B2 * | 11/2010 | Jamieson | B60D 1/06 | 280/460.1 |
| 7,934,743 | B1 * | 5/2011 | Wall | B62D 53/0864 | 280/476.1 |
| 8,534,694 | B2 * | 9/2013 | Banwart | B61D 3/187 | 280/476.1 |
| 8,534,695 | B2 * | 9/2013 | Columbia | B60D 1/46 | 280/514 |
| 8,794,656 | B2 * | 8/2014 | West | B62D 53/0864 | 280/479.2 |
| 8,820,443 | B2 * | 9/2014 | Ferri | B62D 59/04 | 180/14.2 |
| 8,919,802 | B2 * | 12/2014 | Knight | B60D 1/665 | 280/476.1 |
| 9,126,644 | B2 * | 9/2015 | Banwart | B62D 53/0842 | |
| 9,381,782 | B2 * | 7/2016 | Schwennsen | B60D 1/247 | |
| 9,676,239 | B1 * | 6/2017 | Lusty | B62D 53/00 | |
| 9,987,965 | B2 * | 6/2018 | Flathers | B62D 53/10 | |
| 10,449,954 | B2 * | 10/2019 | Layfield | B60W 30/02 | |
| 11,691,680 | B2 * | 7/2023 | Walton | B60D 1/173 | 280/476.1 |
| 2007/0040353 | A1 * | 2/2007 | Dallaire | B60Q 1/305 | 280/476.1 |
| 2015/0307142 | A1 * | 10/2015 | Layfield | B62D 25/188 | 280/476.1 |
| 2022/0097782 | A1 * | 3/2022 | Walton | B60D 1/07 | |

* cited by examiner 200
208
204
268
272
252
254
248
244
250
240
232
238
242B
242A
202
218A
216B
218B
214B
224B
210
226B
222
226A
224A
216A
290A
214A

TRAILER DOLLY APPARATUS

CROSS-REFERENCE TO RELATED APPLICATIONS

This application is a continuation-in-part of U.S. Non-Provisional patent application Ser. No. 16/941,110 filed on Sep. 28, 2020, which is incorporated herein by reference.

TECHNICAL FIELD

The instant invention may be considered in the field of tandem-trailers trucked triple, can be exceptionally long consisting of a truck or SUV pulling two trailers hooked up tandem. Where a trailer dolly apparatus is used to support the weight of the last trailer that attaches to the other tandem trailer supporting the weight on the dolly not the tandem trailers rear end hitches. Not exceeding light tongue ball and hitch to truck or SUV will cause a more harmonious outcome.

BACKGROUND

There is a need in the industry of trailer dollies. Larger trailers, typically fifth wheels, are heavy and can attach another trailer in tandem in a triple configuration of two trailers and a towing vehicle. The lighter ball-mount hitch trailer should not try to haul in tandem unless the second tail trailer is small and light.

Trailer dollies are patented for supporting the tongue-weight of a trailer while being towed. The connecting means of the towed trailer is behind the towing vehicle not designed for triple towing (U.S. Pat. No. 3,865,405A/1975 Mitchell et al., U.S. Pat. No. 2,592,219A/1952 West et al., U.S. Pat. No. 6,681,535B1/2004 Ty Batchelor, U.S. Pat. No. 6,685,211 B2/2004 Inventor Arthur R. Iles, U.S. Pat. No. 2,450,215A/1948 Inventor William A Wilson, and U.S. Pat. No. 6,820,887B1/2004 Inventor Robert E. Riggle).

A dolly for semitrailers has been patented. This transportation dolly is mainly used to improve the connection of two semitrailers in tandem. This type of apparatus assists in distributing the tongue weight of the last semitrailer onto the support dolly not applying forces to the other tandem semitrailer (U.S. Pat. No. 3,421,777A/1969 Inventor Barker et al).

Situations, where the trailer reaches its gross trailer weight is when the weight of a trailer is fully loaded at maximum capacity. This condition causes increase trailer tongue weight that can weigh as much as 3,000 pounds. Tongue weights of this magnitude can unsafely overload the weight capacity of the camper trailers rear end when traveling. An increased load as much as 3,000 pounds, for example, a tandem trailer tongue hitch without dolly attached at rear end of the travel trailer frame will have problems traveling through bumps, potholes, bridges, and similar occurrences during travel which can damage the frame, chassis, and/or body of the trail trailer. An unsafe condition for the towing vehicle.

Other issues happen when the tandem trailer is towed in a position that is not horizontal with respect to the road. This produces unsafe forces on the tandem trailer tongue and hitch during towing that is not designed to safely support under tow.

Accordingly, what is needed is a dolly for towing tandem trailers that overcomes the frame, chassis, and/or body damage to towed trailers, the horizontal alignment of the trailer, and the steering drawbacks of conventional modes of towing dual trailers being two trailers and a vehicle.

The proposed patent application differs in that the trailer dolly is used primarily behind the travel trailer in a tandem triple towing configuration and is used to support the tongue weight of the last trailer. This tandem towing can be accomplished without a commercial driver's license (CDL) or class A license.

SUMMARY OF EXAMPLE EMBODIMENTS

Regarding triple towing, fifth wheel trailers come with a tow hitch sleeve at rear of the trailer for towing tandem trailers. The problem is some fifth wheeler trailers are too long to legally tow tandem trailers. Trailers are allowed up to 45 feet maximum length. Fifth wheel trailers range from 25-45 feet. Maximum length of the towing vehicle and trailers combined is 65 feet with a basic class C license. Maximum length of the towing vehicle and trailers combined is 75 feet with a commercial class A license. With a 45 feet fifth wheel trailer towed by a typical class C license truck range 17-20 feet in length, the maximum legal length of 65 feet approximately happens with no option for tandem towing with a basic class C license, and with a class A license the recreational trailers can be no more than 10-13 feet in length.

The average travel trailer or a camper trailer is around 20 feet in length and 8 feet in width. Travel trailers need a towing truck or a SUV depending on the size and weight of the trailer. This type of a trailer is generally tongue and ball hitch attachment. These types of camper trailers do not come with a towing sleeve attachment mounted at the rear of the trailer for tandem or triple towing due to up lift. This invention's niche in the market hovers within these average camper trailers. A 20 feet truck or SUV attached to a 20 feet camper trailer can haul 25 feet more in tandem triple towing and be within the maximum limits for basic class C drivers. The trailer dolly subtracts about 2 feet from the 25 feet giving the vacationer a total of 23 feet for a recreation vehicle (RV) trailer. The problem with a 23 feet boat and trailer can be heavy at the tongue hitch causing sway of the camper trailer tongue hitch.

Many vacationers tow triple tandem trailers with fifth wheel trailers that are heavy with most ranging 7,000-20,000 pounds depending on the trailer length. Towing in triple with an additional tandem RV trailer is no problem for this type of trailer. Camper trailers with ball-mounted hitch weights range between 1,550 pounds for a 13 feet trailer to 6,600 pounds for a 35 feet camper trailer.

Trailers with ball-mounted hitches should have tongue weight that is between 10-15% of the total trailer weight. Example, a 3,000-pound ball-mounted hitch trailer is loaded with 2,000 pounds of cargo, the proper tongue weight of the loaded trailer should be between 500 and 750 pounds.

When the tongue of the trailer does not have enough downward weight on the towing vehicle's ball mount hitch, the trailer's tongue weight is extremely light. Too light of a ball mount tongue and hitch causes a dangerous condition called trailer sway. When the tongue weight is extremely heavy, the steering of the towing vehicle is affected.

The typical ski boat weighs about 3,500 pounds plus trailer weight of 1,000 pounds, speed boats weigh around 8,000 pounds with trailer weight of 1,300 pounds, and cabin cruisers weigh about 8,700 pounds add another 1,600 pounds of trailer weight totaling 10,300 for the cabin cruiser on its trailer. Example, the cabin cruiser tongue weight is between 1,030 to 1,545 pounds. Example, a 22 feet camper trailer weighs 3,600 pounds with tongue weight between 360 to 540 pounds is hauling in tandem a cabin cruiser boat and trailer triple tow by a truck. Clearly the weight of the last trailer of cabin cruiser boat and trailer is going to cause trailer sway.

DETAILED DESCRIPTION OF EXAMPLE EMBODIMENTS

Figure 1:
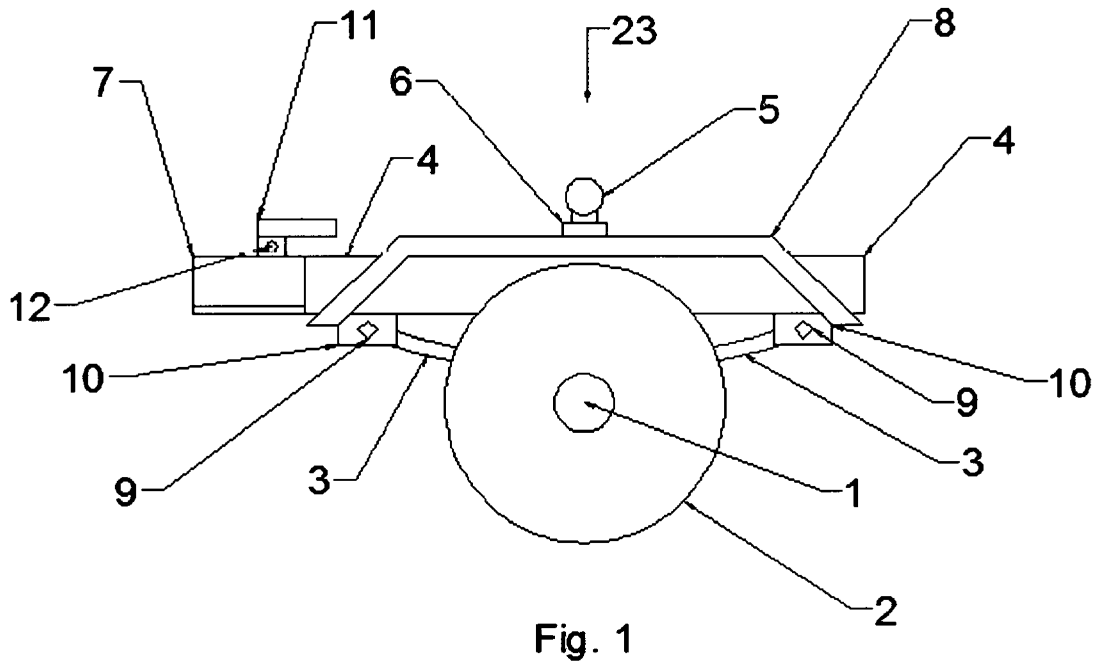
FIG. 1 is a side view of the embodiment showing the tandem trailer dolly apparatus.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

The materials in manufacturing the tandem trailer dolly apparatus are steel, rubber tires, grease for the hubs, and wheels. The fastening means will be welding, clipping, pinning, capping, and bolting the materials together, or all five attaching ways combined.

FIG. 1, a tandem trailer dolly embodiment 23 comprises an axial 1 for wheels 2, leaf spring suspension 3 with bracket 10 and U-bolt 9 with nuts to hold the leaf springs in place is provided to cushion the shock of potholes and bridges etc. A frame 4 made of steel. A ball hitch 5 to hitch the tongue of a tandem trailer has a trailer hitch sleeve for adjustable hitch slides up and down. The ball mount 6 is screw or weld the ball hitch 5 on adjustable hitch. The adjustable hitch has cylindrical holes for height adjustment and is static when pinned. The adjustable hitch is for horizontal leveling of tail end tandem trailer. The trailer hitch tongues 7, latches 11, and pins 12 are provided to secure the dolly 23 with no side to side turning ability only swivel up and down. Fenders 8 are provided to protect from projectiles striking tandem trailer. This apparatus primary use is hitched to the rear of the trailer being towed by the vehicle where tandem trailer weight is supported on the dolly. It will be appreciated that the ball hitch adjusts up and down for horizontal leveling of tandem trailer, and the shock-absorbing system cushions from bumps.

Figure 2:
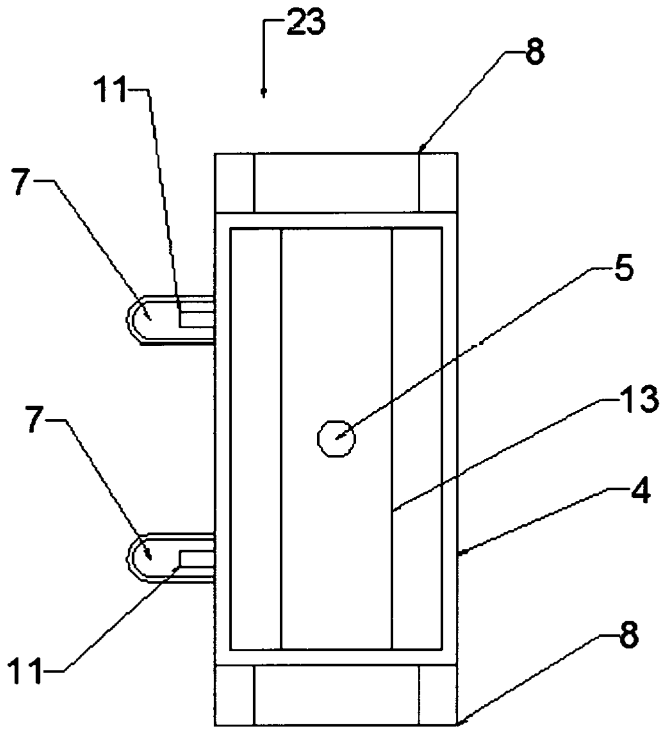
FIG. 2 is a top view of the embodiment showing the tandem trailer dolly apparatus has two tongue hitches.

FIG. 2 discloses the embodiment 23, which has a steel plate 13 for structural stability of trailer dolly 23 frame 4 and fastens the ball hitch 5 in place. A view of the dual tongue hitches 7 and latches 11 are provided. The fenders 8 are seen. The ball hitch is coaxial with the axle and at the midway point of the trailer. The steel plate 13 supports the weight of the adjustable ball hitch.

Figure 3:
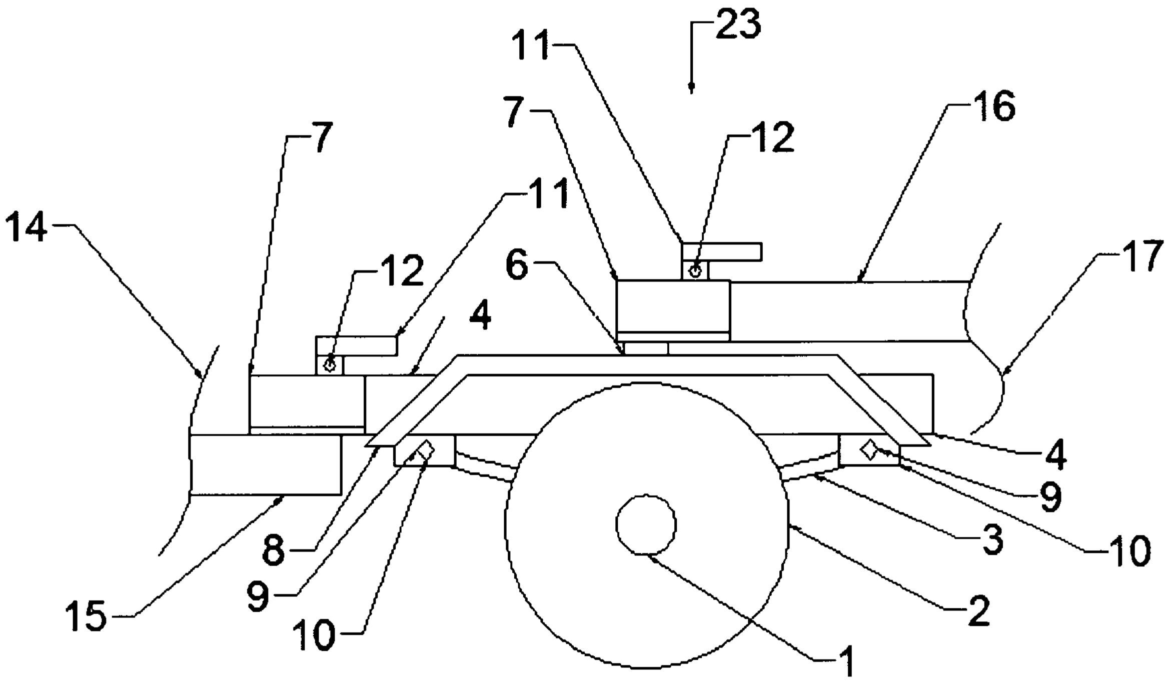
FIG. 3 is a side view of the embodiment showing the tandem trailer dolly apparatus.

FIG. 3 discloses embodiment 23, tandem trailer dolly 23 being towed by trailer 14 is towed tandem with trailer 17, showing trailer 17 tongue 16 latch 12 swivels side to side on ball 5, ball hitch mount 6 and hitch 7. All of embodiment 23, primary trailer 14, and tandem trailer dolly 23 assisting secondary trailer 17 are in triple tandem towing, towing vehicle not seen in diagram. Adjustable ball hitch sleeve 6 is for horizontal leveling. As such, a user would connect by tongue and hitch method to the adjoining tandem trailers rear and the last trailer attaches by means of ball hitch centered on top of trailer dolly apparatus, said tongue weight from last trailer causes a downward force through the dolly center to the ground.

Figure 4:
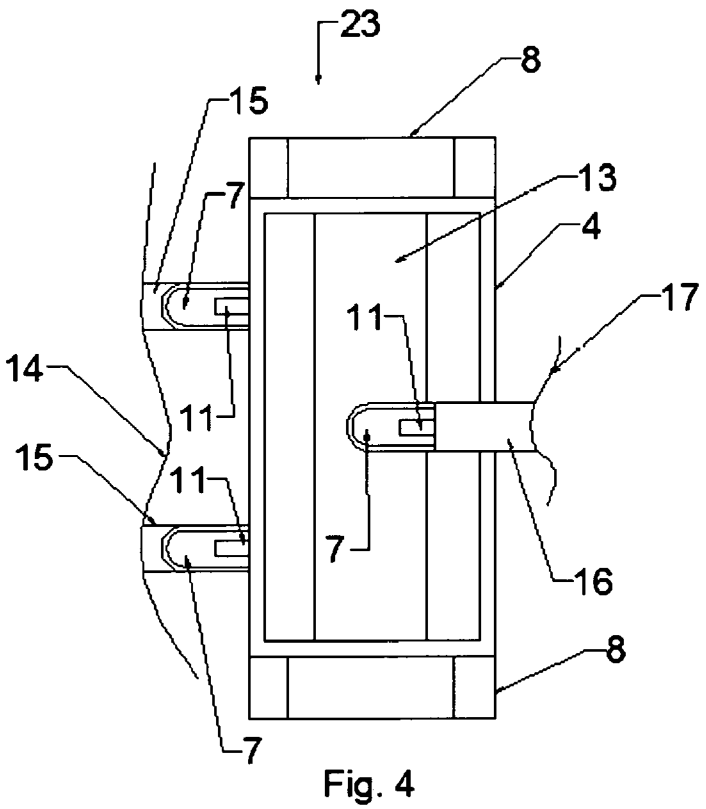
FIG. 4 is a top view of the embodiment showing the tandem trailer dolly apparatus.

FIG. 4 discloses embodiment 23, that has no pivotal side to side abilities at tongue hitches 7 only up and down motion that is attached to trailer hitches 15 at the rear of trailer 14.

That tandem trailer 17 is attached through ball hitch to tongue hitch 7 of trailer 17 can pivot side to side or up and down. Trailer 23 has no turning capabilities fixing the hitch attachments to the rear of adjoining trailer with up and down swivel functions. The last trailer tongue and ball hitch of the triple towing tandem trailers can swivel side to side and up and down.

Figure 5:
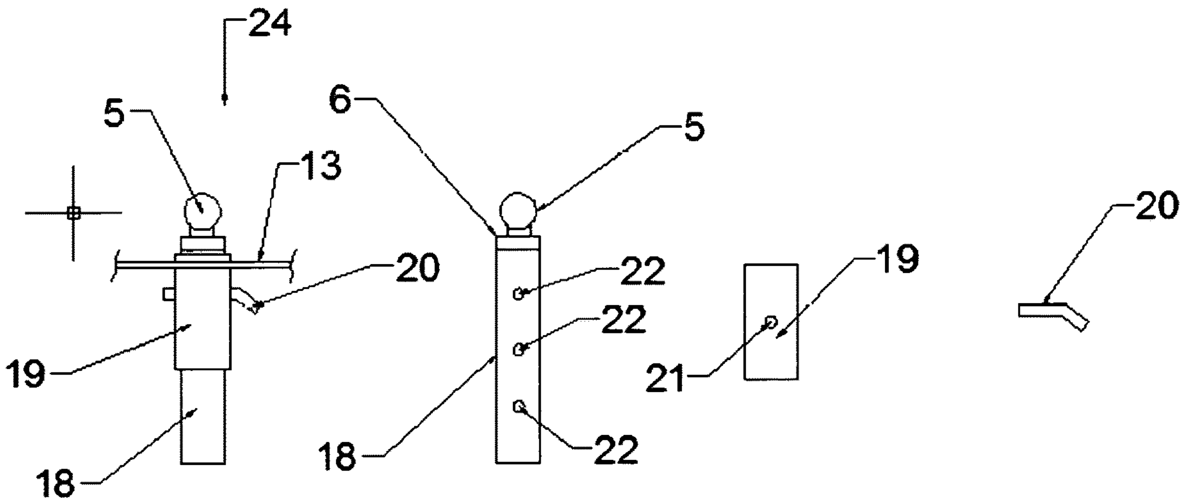
FIG. 5 is a side view of the embodiments ball hitch mechanism with adjustable height in sleeve and fastener pin.

FIG. 5 discloses embodiment 24, with ball 5 and hitch 18 is adjustable with cylindrical holes 22 for pinning 20. A hitch sleeve 19 welded to plate 13 provide the framework to hold ball 5 hitch 18 in place under towing conditions. That adjustable ball hitch centers coaxial with the axle and at the midway point, measured midpoint from right side to left side intersecting coaxial line with midway line of the trailer.

Figure 6:
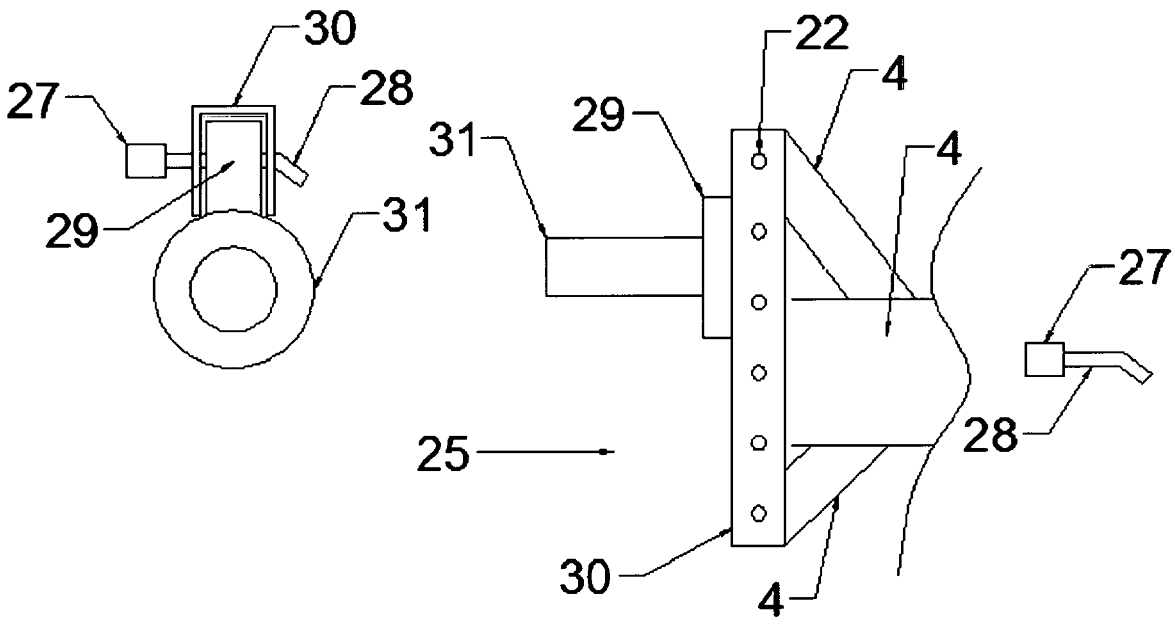
FIG. 6 is a side and top view of the embodiments pintle hook towing receiver that has an adjustable trailer hitch.

FIG. 6 discloses embodiment 25, shows towing receiver 31 with steel square formed 29 for pinning 28, towing receiver is all one piece 31 and 29. There are two pins 28 with locks 27 for pinning 28 and locking 27 towing receiver 31 to adjustable trailer hitch 30 through holes 22. The adjustable trailer hitch 30 is framed 4 into tandem trailer dolly 25. The adjustable trailer hitch has holes for pinning through towing receiver cylindrical holes. The pins have a locking mechanism. The adjustable trailer hitch is welded or bolted into the dolly frame.

Figure 7:
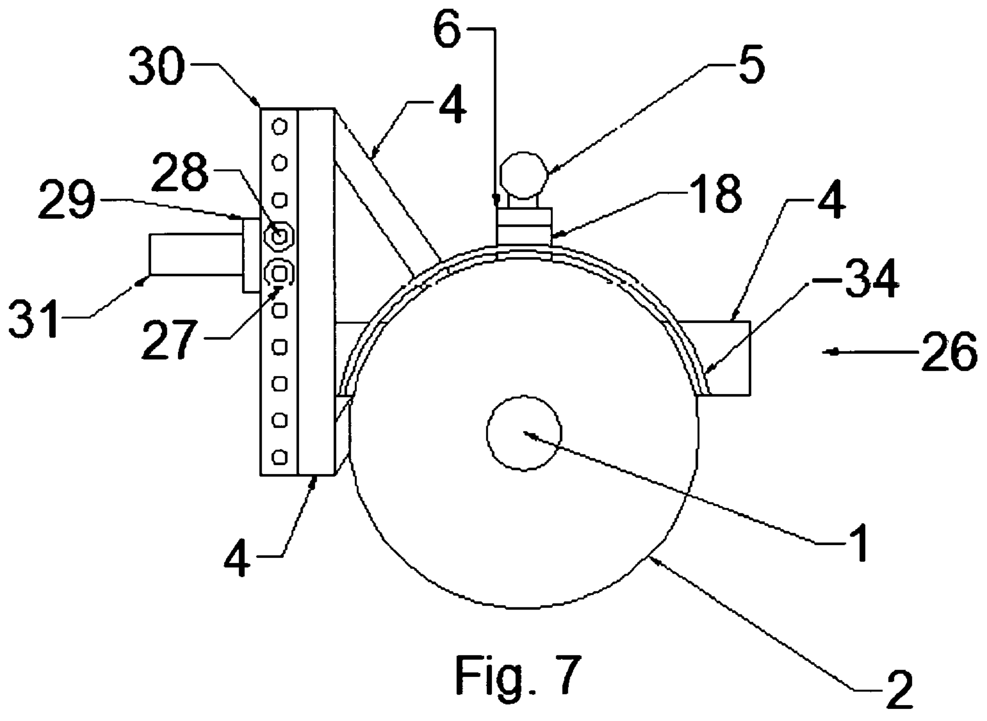
FIG. 7 is a side view of the embodiments tandem trailer dolly apparatus with no shock-absorbing system.

FIG. 7 discloses embodiment 26, that shows this tandem trailer dolly 26 has adjustable trailer hitch 30 and towing receiver 31 to line up primary trailer horizontal level. The ball hitch 5 attached by ball mount 6 is either screwed or welded to adjustable hitch 18. The adjustable ball 5 and hitch 18 are for horizontal leveling of rear tandem trailer. There is additional framing 4 to dolly 26 frame 4 securing adjustable hitch 30 that holds towing receiver 31 by means of pins 28 with locks 27. The towing receiver 31 and adjustable hitch 30 is for horizontal leveling of tandem trailer dolly 26. The axle 1 is attached directly to frame 4 by welding or U-bolts. The wheels 2 have fenders 34 to stop projectiles when wheels 2 contact lose debris on the road. Hubs for wheels attach to the axle. The ball hitch is adjustable up and down. The tongue towing receivers adjust up and down through the adjustable trailer hitches for horizontal leveling of dolly. Two pins have locking ends through the towing receivers and adjustable trailer hitches.

Figure 8:
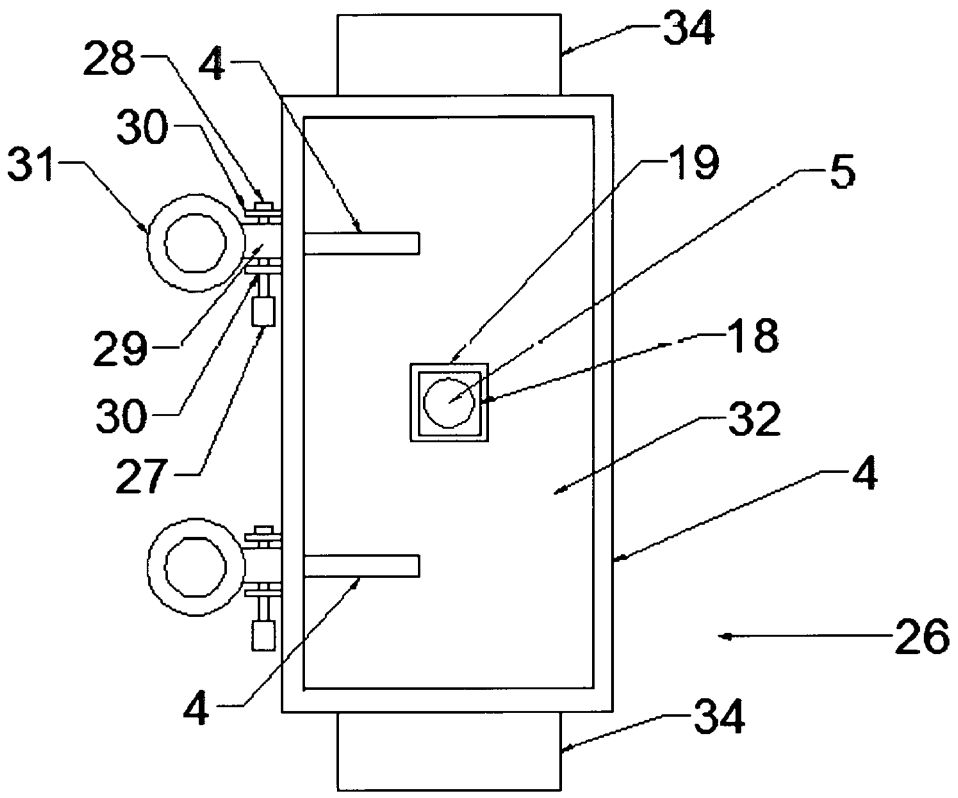
FIG. 8 is a top view of the embodiments tandem trailer dolly apparatus has a steel plate platform welded or bolted to the dolly frame.

FIG. 8 discloses embodiment 26, showing steel plate 32 is welded or bolted to frame 4. Here is clearly seen tow hitch sleeve 19, adjustable hitch 18, and ball hitch 5. The adjustable ball 5 hitch 18 make horizontal leveling easy for rear tandem trailer. The adjustable hitches 30 fastening pins 28 and locks 27, secure towing receivers 31 bases 29 to adjustable hitches 30. The adjustable towing receiver's 31 capability allow the tandem trailer dolly 26 to be horizontally leveled. The pintle hook towing receivers 31 are stationary allowing no side to side turning, the only rotation is up and down. The adjustable ball hitch is attached to this platform. The tongue towing receivers adjustable trailer hitches framing mounts attach to the platform welded or bolted.

Figure 9:
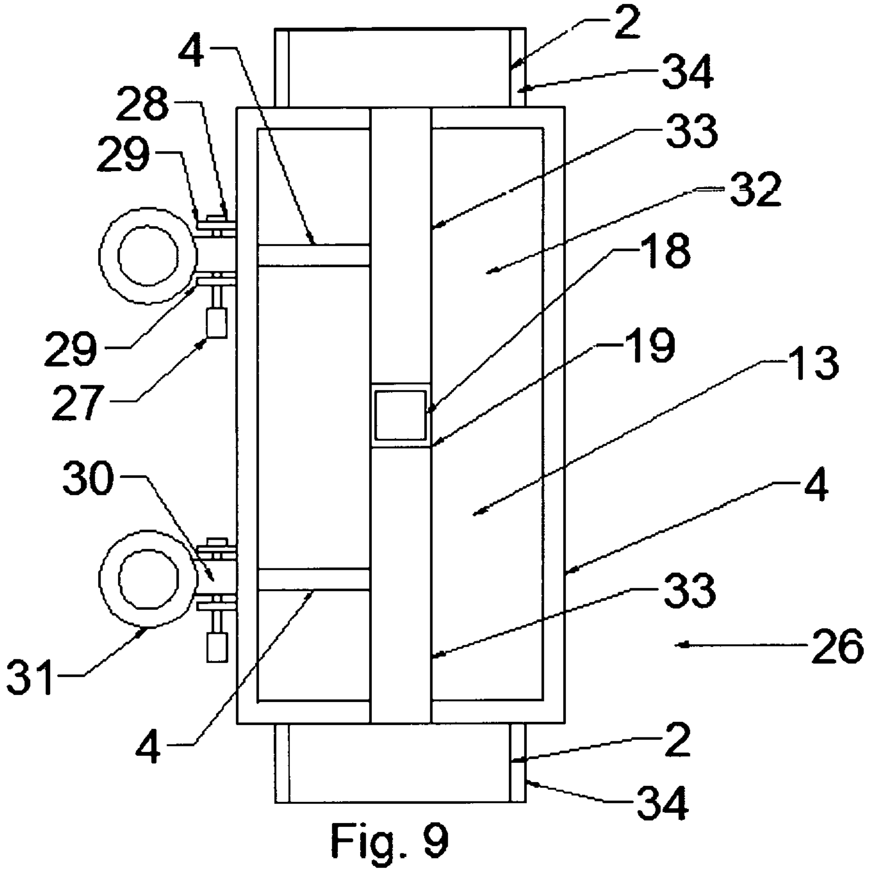
FIG. 9 is a bottom view of the embodiments tandem trailer dolly apparatus. Showing axle mounted to the frame with no suspension for absorbing bumps.
Figure 10:
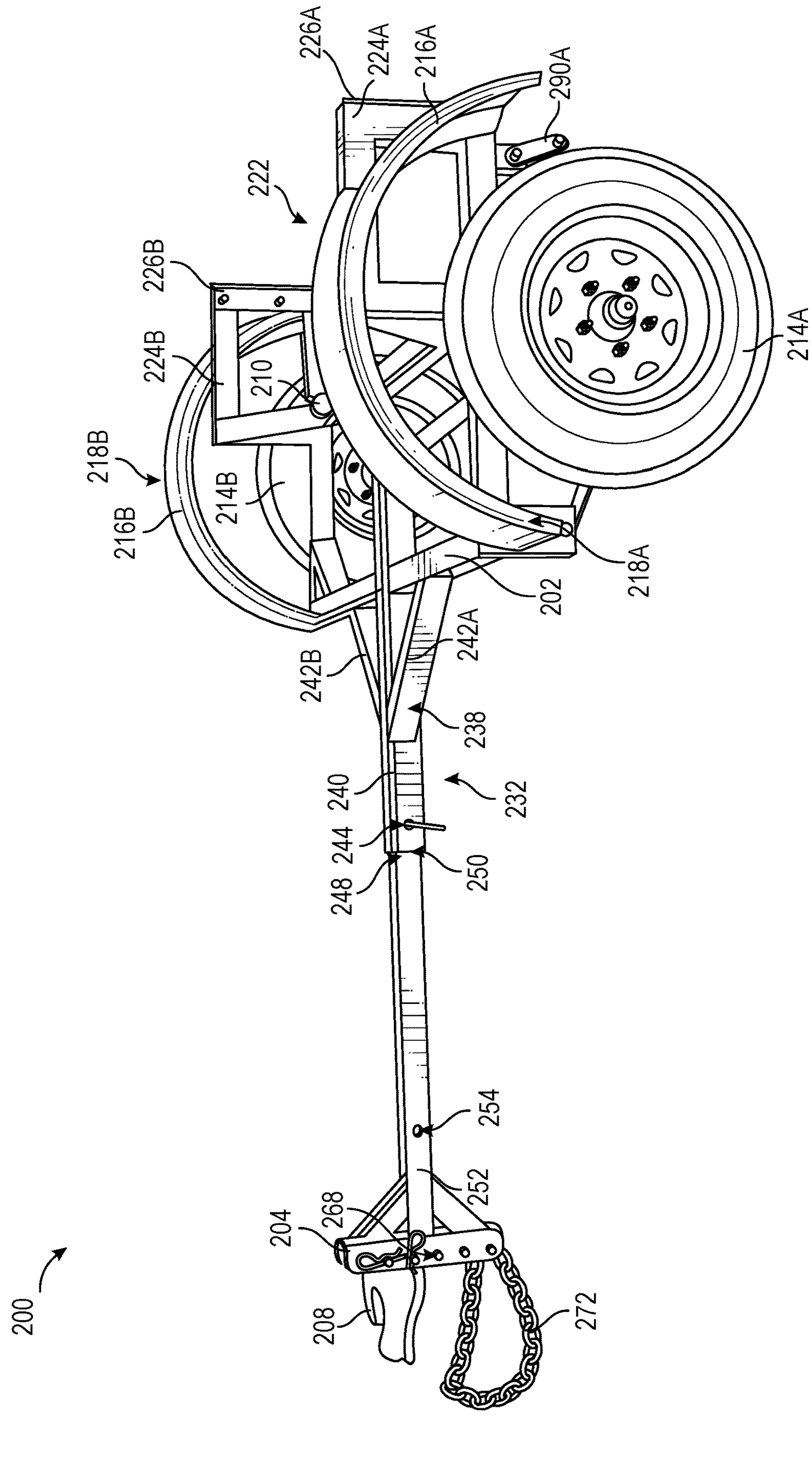
FIG. 10 is a left-side perspective view of a trailer dolly apparatus.

FIG. 9 discloses embodiment 26, which shows how axle 33 is mounted to dolly frame 4 by means of welding or U-bolting. This axle 33 is square and at the axle 33 midpoint is hitch sleeve 19. This functioning hitch sleeve 19 passing through axle 33, has hitch sleeve 19 and axle 33 welded as one unit. By having hitch sleeve 19 welded to axle 33 attached by welding or U-bolts to steel plate 32. This way hitch sleeve 19 slides adjustable ball hitch 18 ball 5 down to the steel plate 32 platform or other heights up in an attempt to horizontal level towed rear tandem trailer. The adjustable ball hitch sleeve is coaxial with the axle and at the midpoint center of the axle. The tongue towing receivers adjustable trailer hitches framing mounts attach to the platform welded or bolted.

As shown in FIGS. 10-14, in one embodiment, a trailer dolly apparatus 200 comprises a dolly frame 202, an adjustable trailer hitch 204, a towing receiver 208, an adjustable ball hitch 210, an axle 212, and at least two ground engaging wheels 214A, 214B. The trailer dolly apparatus 200 may couple a primary trailer to a secondary trailer, or a vehicle to a primary trailer.

The dolly frame 202 comprises a first fender 216A and a second fender 216B, each of which are configured to prevent debris from causing damage to either the primary or secondary trailer. The first and second fenders 216A, 216B may be coupled to a first side 218A of the dolly frame 202 and a second side 218B of the dolly frame 202, respectively. The first and second fenders 216A, 216B may be coupled to the dolly frame 202 via welding. Other fastening mechanisms to couple the first and second fenders 216A, 216B to the dolly frame 202 may include bolts and nuts, pins and locks, etc. The dolly frame 202 may be generally rectangular-shaped. However, the shape of the dolly frame 202 may vary and, in some embodiments, may be generally square-shaped. The dolly frame 202 may also comprise a first corner support 220A, a second corner support 220B, a third corner support 220C, and a fourth corner support 220D (shown in FIG. 13). The first, second, third, and fourth corner supports 220A, 220B, 220C, 220D provide additional strength and stability to the dolly frame 202. While four corner supports 220A, 220B 220C, 220D are shown, it will be understood that more or less than four corner supports may be coupled to the dolly frame 202 without departing herefrom. The first, second, third, and fourth corner supports 220A, 220B 220C, 220D may be coupled to the dolly frame 202 via welding, or any other fastening mechanism.

A rear section 222 of the dolly frame 202 may comprise a first bumper frame 224A that extends upward and couples to the first fender 216A and the dolly frame 202. The rear section 222 may also comprise a second bumper frame 224B that extends upward and couples to the second fender 216B. Both the first and second bumper frames 224A, 224B may comprise padded material 226A, 226B, such as carpet or foam. The padded material 226A, 226B may be coupled to the first and second bumper frames 224A, 224B via material fasteners, such as screws, hook and loop, or adhesive.

Figure 13:
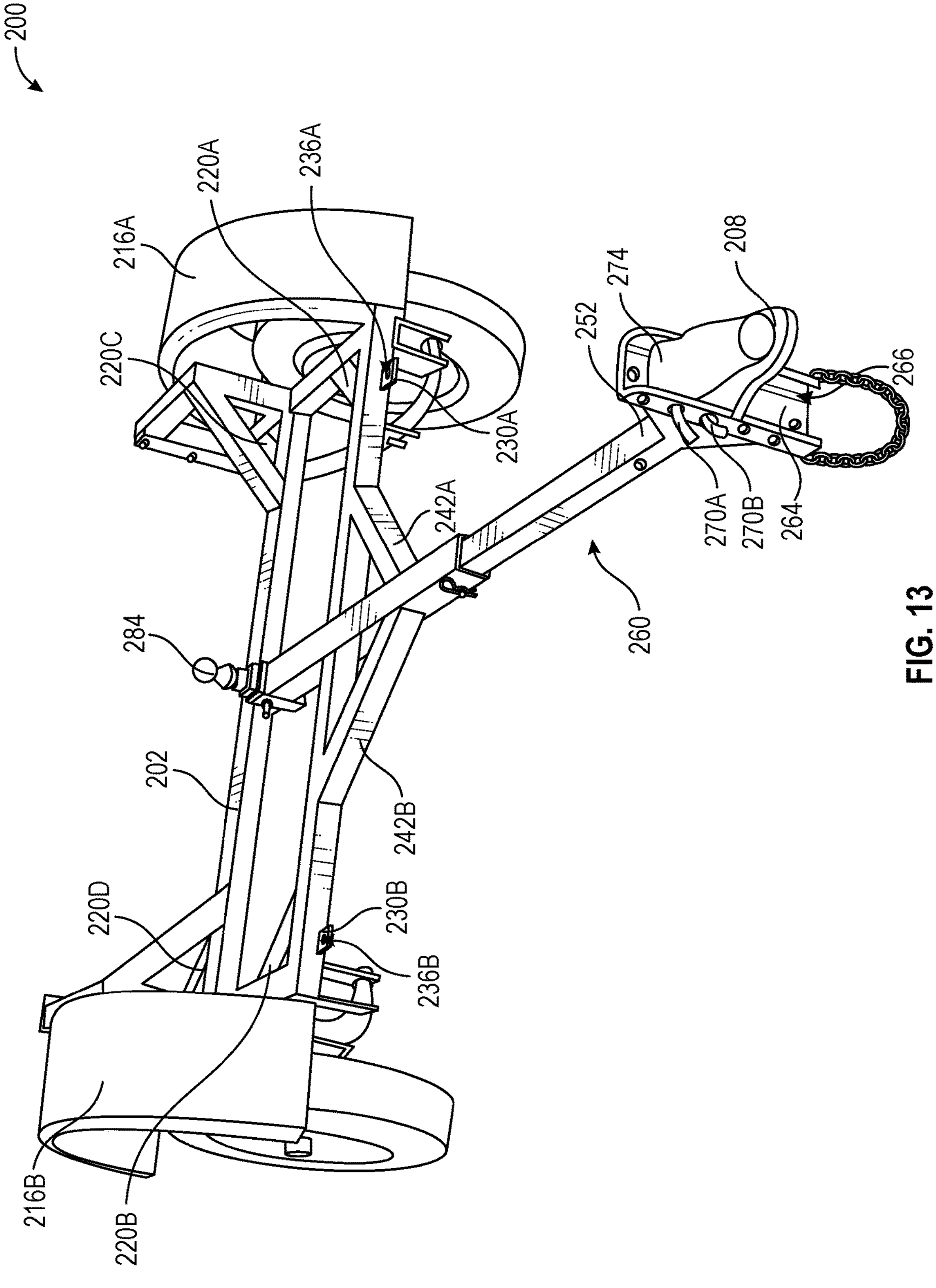
FIG. 13 is a front perspective view of a trailer dolly apparatus.

Furthermore, the dolly frame 202 may comprise rear chain protrusions 228A, 228B at the rear section 222 (FIG. 11) and front chain protrusions 230A, 230B at a front section 232 (FIG. 13). The rear chain protrusions 228A, 228B may comprise rear chain apertures 234A, 234B and the front chain protrusions 230A, 230B may comprise front chain apertures 236A, 236B. The front chain protrusions 230A, 230B may receive backup chains, while the rear chain protrusions 228A, 228B may receive secondary trailer chains.

The front section 232 may comprise a tongue 238 with a first member 240 and a first support arm 242A and a second support arm 242B. The first member 240 may comprise a pin aperture 244 that receives a pin 246 therethrough. The first member 240 may be hollow and comprise a first opening 248 at a first end 250 so as to receive the adjustable trailer hitch 204. In particular, the adjustable trailer hitch 204 may comprise a second member 252 that is smaller in diameter than the first member 240 so that the second member 252 may be positioned in the first member 240, thereby allowing the trailer dolly apparatus 200 to be adjustable in length. The second member 252 may comprise a second pin aperture 254 and a third pin aperture 256, both of which interact with the pin aperture 244 and the pin 246. As such, the second member 252 can be moved from a first position 258 (FIG. 14), with the pin 246 through the second pin aperture 254, to a second, extended position 260, with the pin 246 through the third pin aperture 256.

Figure 12:
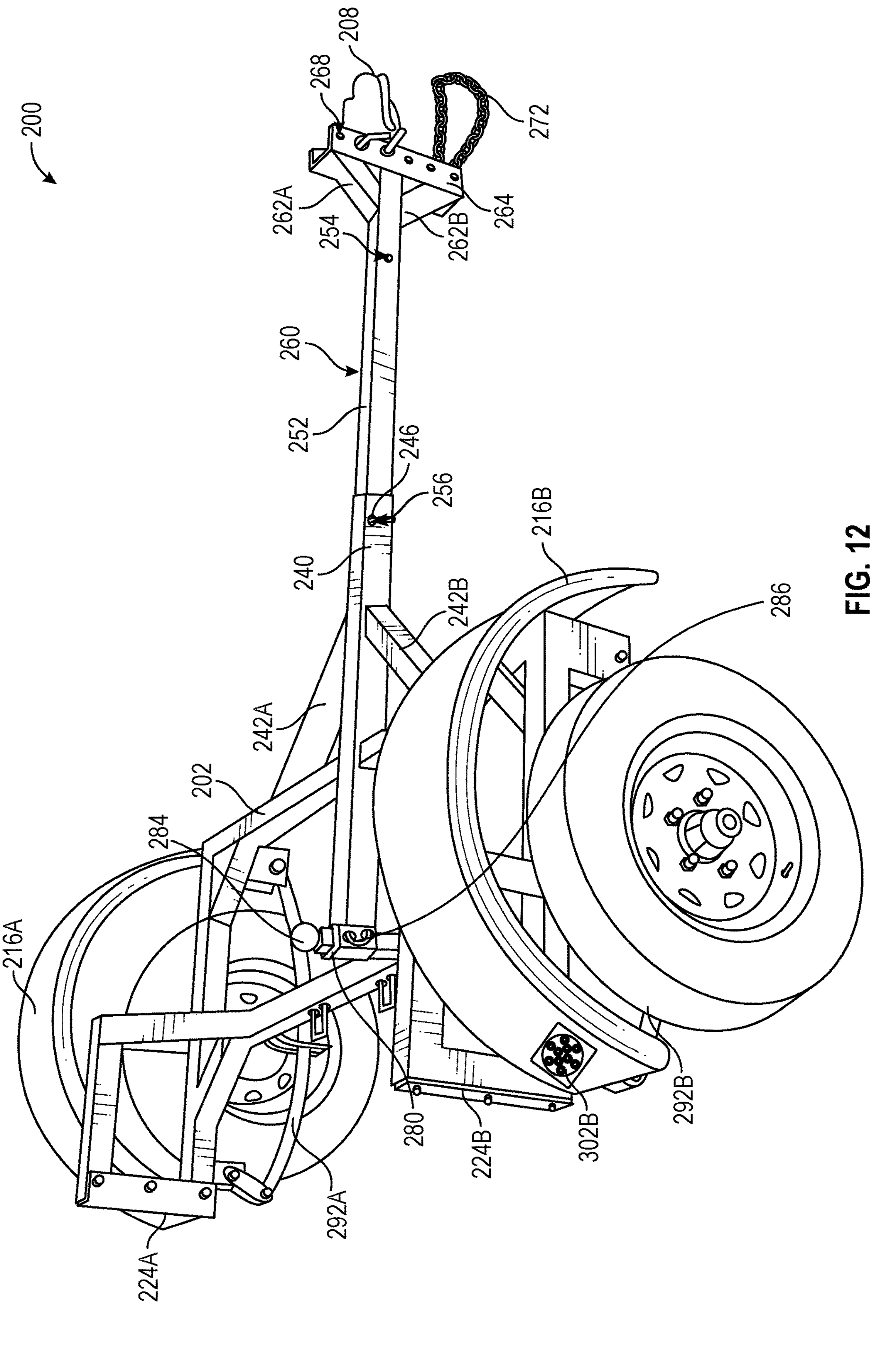
FIG. 12 is a right-side perspective view of a trailer dolly apparatus.

Referring to FIGS. 12-13, at an end opposite insertion into the first member 240, the second member 252 may comprise a first finger 262A and a second finger 262B coupled to a bracket 264 with a channel 266. The bracket 264 may comprise a plurality of apertures 268 to receive one or more second pins 270A, 270B. Further, the plurality of apertures 268 may also receive vehicle chains 272. The towing receiver 208 with a base 274 having apertures may be positioned in the channel 266 of the bracket 264 to interact with the one or more second pins 270A, 270B. The height may be adjusted for the receiver 208 by interacting with the plurality of apertures 268 and the one or more second pins 270A, 270B. The receiver 208 may be configured to receive a ball positioned on a vehicle.

Figure 11:
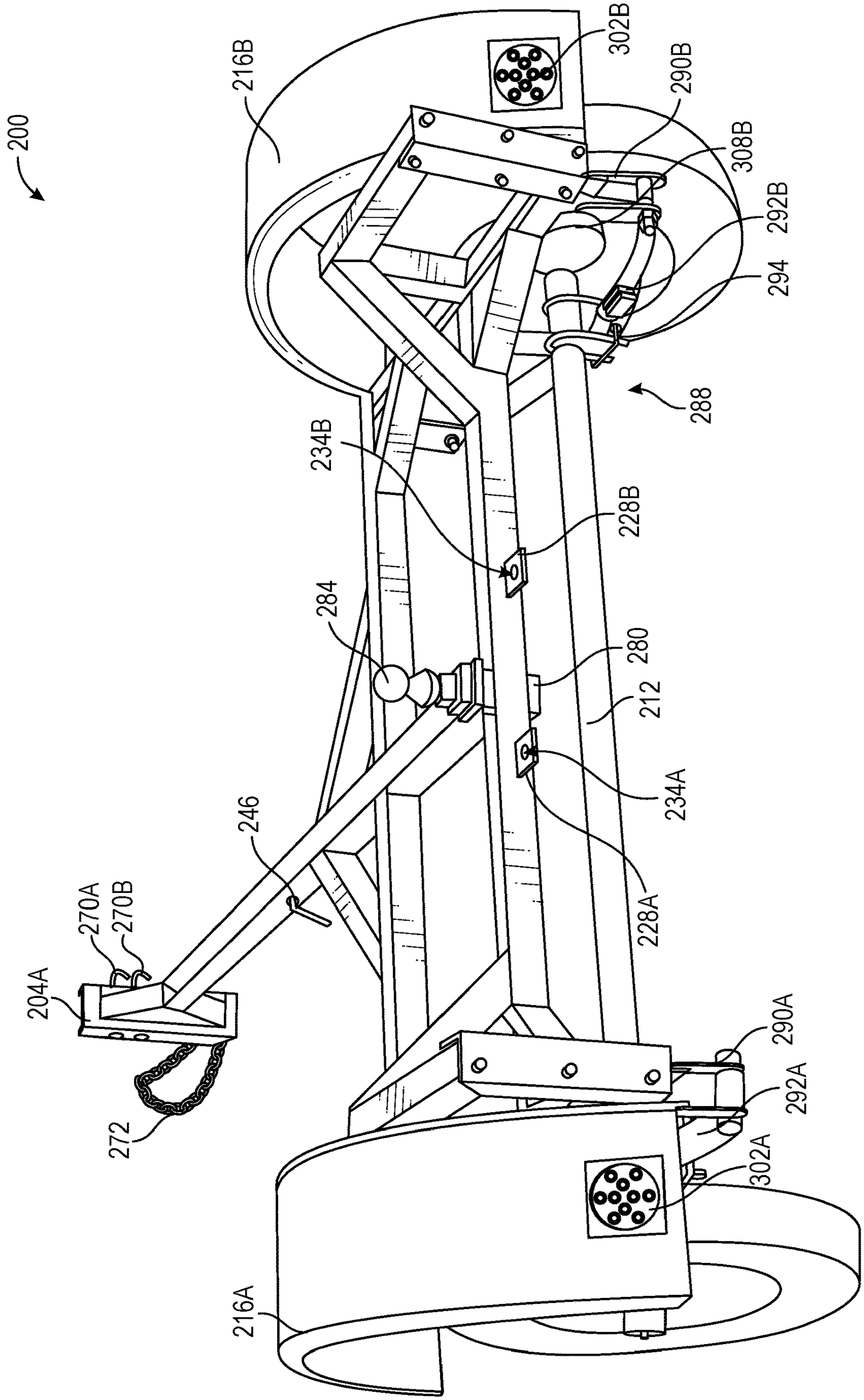
FIG. 11 is a rear perspective view of a trailer dolly apparatus.
Figure 14:
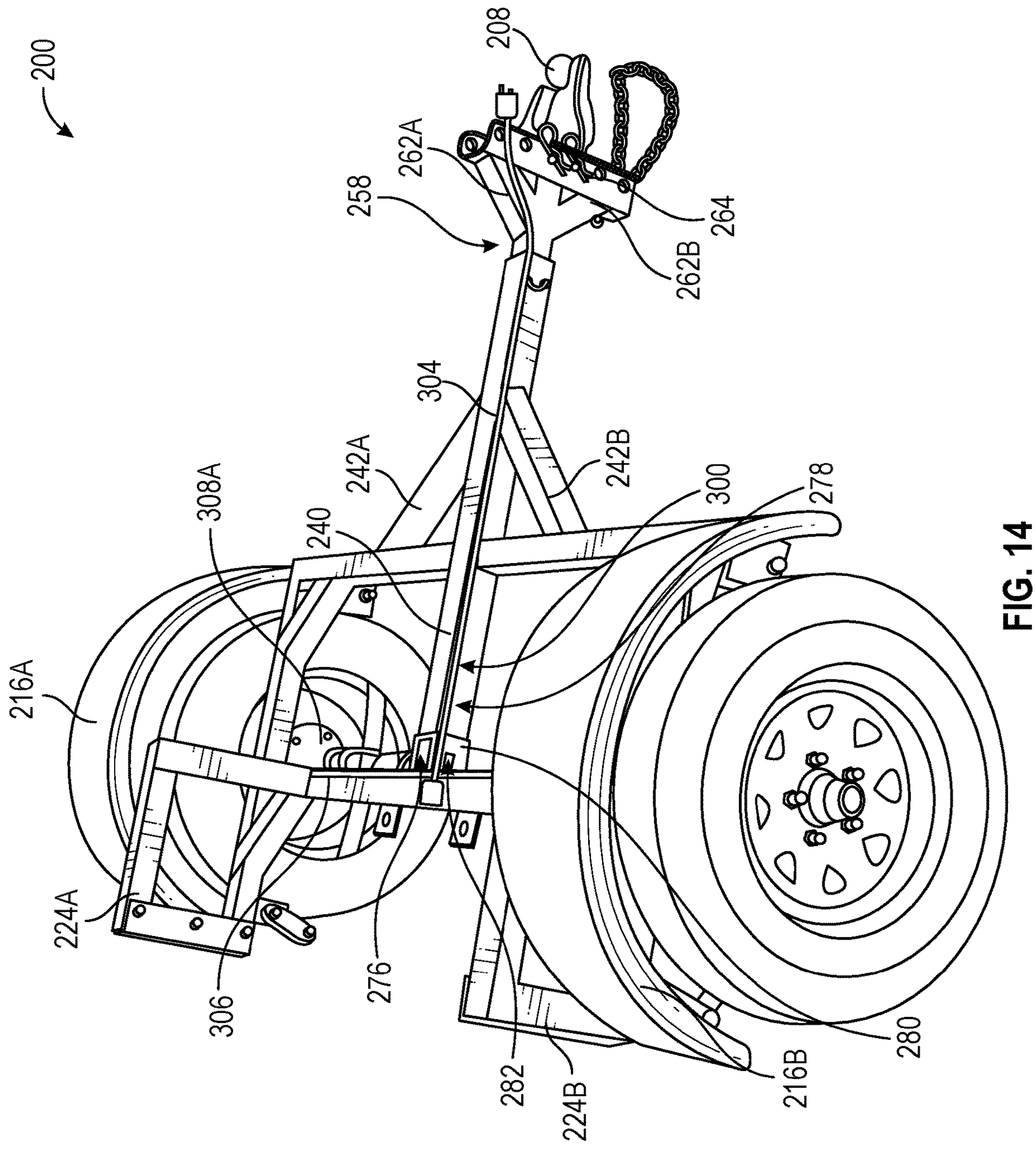
FIG. 14 is a right-side perspective view of a trailer dolly apparatus.

As shown in FIG. 14, the first member 240 may also comprise a second opening 276 at a second end 278. The second opening 276 may be perpendicular to the first opening 248. The second opening 276 may be configured to create a sleeve 280 comprising one or more sleeve apertures 282. The sleeve 280 may be configured to receive the adjustable ball hitch 210 with a removably attachable ball mount 284 (FIG. 11). The adjustable ball hitch 210 may comprise one or more ball hitch apertures that align with the one or more sleeve apertures 282 so as to receive a third pin 286 (FIG. 12) therethrough. As such the adjustable ball hitch 210 may be adjusted vertically.

Referring back to FIG. 11, a lower surface 288 of the dolly frame 202 may comprise first lower brackets 290A on the first side 218A and second lower brackets 290B on the second side 218B. The first lower brackets 290A may receive shocks 292A, and the second lower brackets 290B may receive shocks 292B. The shocks 292A, 292B may be leaf-spring shocks. Other shocks may be used such as telescopic shocks or other shock-absorbing mechanisms. The axle 212 may be coupled to the first wheel 214A and the second wheel 214B. The axle 212 may be coupled to the shocks 292A, 292B via fasteners 294, such as u-shaped bolts.

As shown in FIG. 14, the trailer dolly apparatus 200 may comprise an electronics system 300 that comprises tail lights 302A, 302B (FIG. 11) on the first and second fenders 216A, 216B. The electronics system 300 may also comprise an electrical cord 304 that allows power to transfer from the primary trailer to the secondary trailer, or the vehicle to the primary trailer. The electronics system 300 also comprises brake wiring 306 that connects to electric brakes 308A, 308B (FIG. 11).

Figure 15:
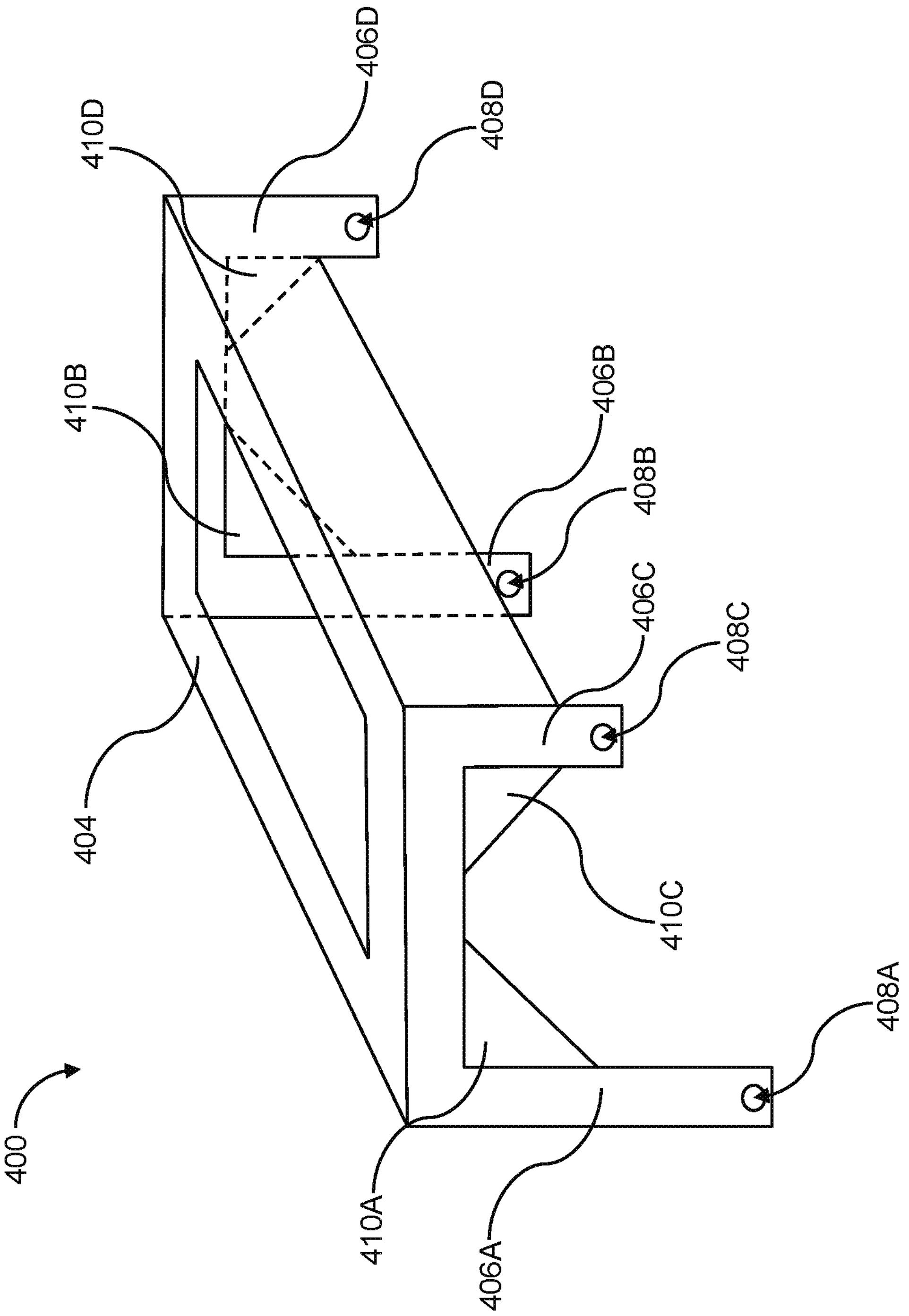
FIG. 15 is a perspective view of a fifth wheel accessory.
Figure 16:
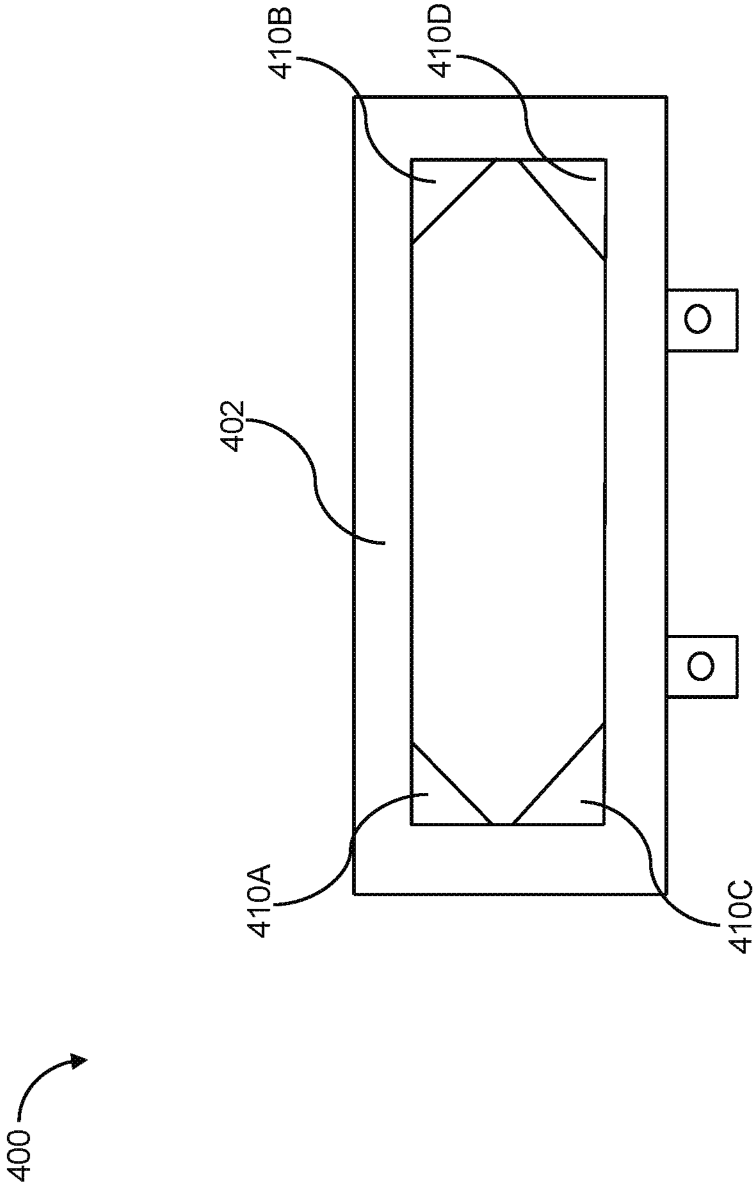
FIG. 16 is a front elevation view of a fifth wheel accessory.
Figure 17:
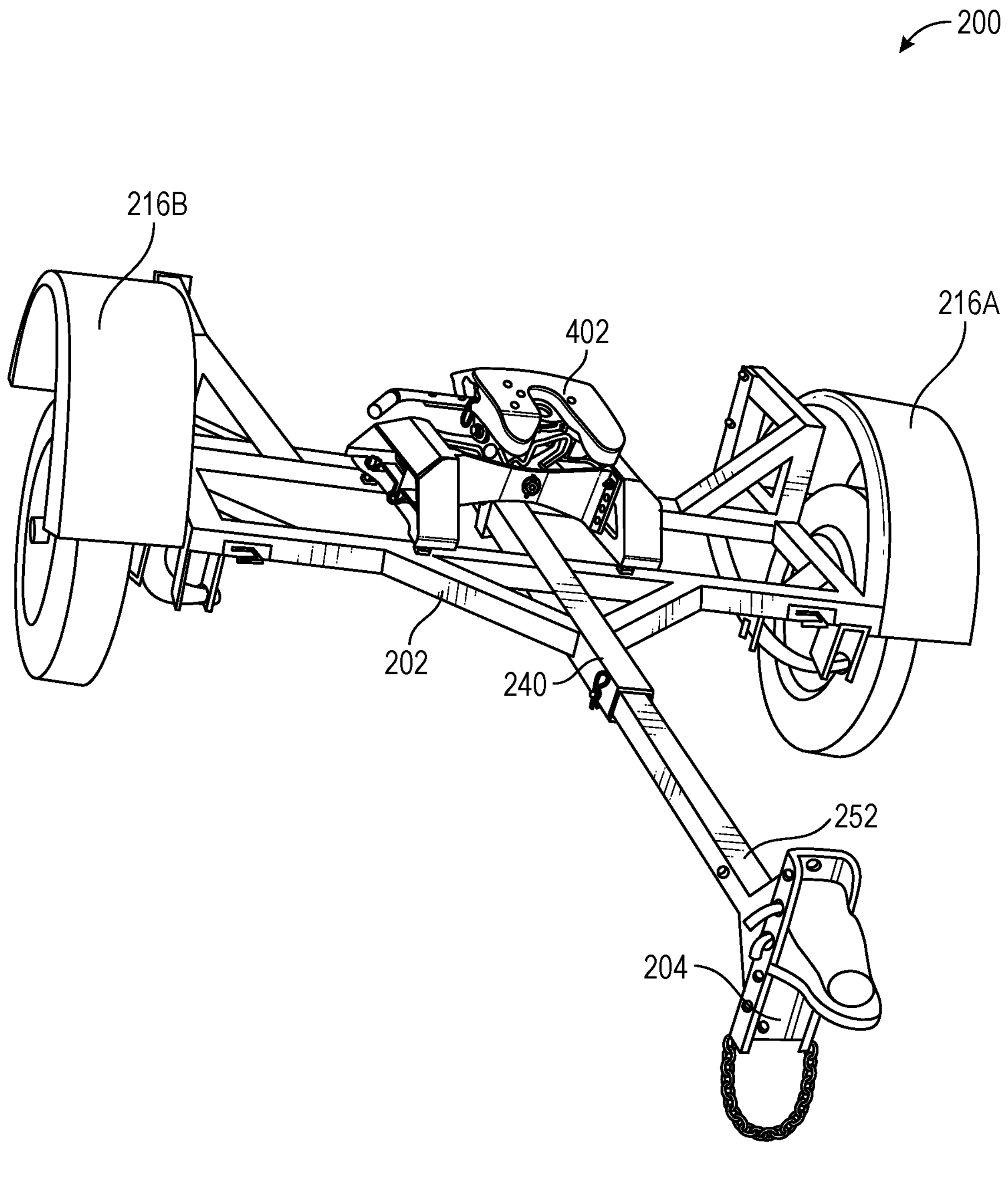
FIG. 17 is a front perspective view of a trailer dolly apparatus with a fifth wheel receiver coupled thereto.

Furthermore, in one embodiment, as shown in FIGS. 15-17, a fifth wheel accessory 400 may be coupled to the dolly frame 202 so as to receive a fifth wheel receiver 402. In some embodiments, the fifth wheel receiver 402 may couple directly to the dolly frame 202. The fifth wheel accessory 400 may comprise a frame 404 with a first leg 406A, a second leg 406B, a third leg 406C, and a fourth leg 406D. The first and second legs 406A, 406B may be the same length as each other while the third and fourth legs 406C, 406D may be the same length as each other. Each of the legs 406A-406D may comprise leg apertures 408A, 408B, 408C, 408D that receive leg pins so that the legs 406A-406D may couple to the dolly frame 202. The fifth wheel accessory 400 may also comprise strut supports 410A, 410B, 410C, 410D that add rigidity thereto. In other embodiments, the fifth wheel accessory 400 may be coupled to the dolly frame 202 via welding or any other fastening mechanism.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A trailer dolly apparatus comprising:

a dolly frame comprising:

a first fender coupled to a first side of the dolly frame and a second fender coupled to a second side of the dolly frame;

a plurality of corner supports;

a first bumper frame and a second bumper frame each coupled to a rear section, the first bumper frame extending upward and coupled to the first fender, a first back section of the first bumper frame comprises a first section of padded material, and the second bumper frame extending upward and coupled to the second fender, a second back section of the second bumper frame comprises a first section of padded material;

a tongue with a first member, a first support arm, and a second support arm, the first member comprising a sleeve;

an axle;

two ground engaging wheels;

an adjustable trailer hitch comprising a second member, the second member may be positioned in the first member and extend therefrom; the adjustable trailer hitch fastens to either a vehicle or a primary trailer, the adjustable trailer hitch comprising a bracket with a channel;

a towing receiver with a base that is positioned in the channel of the bracket and is adjustably coupleable thereto;

an adjustable ball hitch removably attachable to the sleeve for pivotally connecting a tongue hitch of the primary trailer or a secondary trailer to the trailer dolly apparatus;

a shock absorbing mechanism provided between the axle and the dolly frame to absorb shocks from the road; and an electronic system.

2. The trailer dolly apparatus of claim 1, wherein the shock-absorbing mechanism comprises leaf springs.

3. The trailer dolly apparatus of claim 1, wherein the rear section of the frame comprises rear chain protrusions.

4. The trailer dolly apparatus of claim 1, further comprising front chain protrusions fastened to a front section of the dolly frame.

5. The trailer dolly apparatus of claim 1, wherein the first member comprises a pin aperture that receives a pin therethrough.

6. The trailer dolly apparatus of claim 1, wherein the second member comprises a first finger and a second finger.

7. The trailer dolly apparatus of claim 1, wherein the bracket comprises a plurality of apertures that receive one or more second pins.

8. The trailer dolly apparatus of claim 1, wherein the first member comprises a second opening with the sleeve that receives the adjustable ball hitch.

9. The trailer dolly apparatus of claim 1, wherein the adjustable ball hitch comprises one or more sleeve apertures.

10. The trailer dolly apparatus of claim 1, further comprising first lower brackets and second lower brackets that secure the shock-absorbing mechanism to the dolly frame.

11. The trailer dolly apparatus of claim 1, wherein the axle is coupled to the shock-absorbing mechanism via fasteners.

12. The trailer dolly apparatus of claim 1, wherein the electronic system comprises tail lights on the first and second fenders, electrical cords that transfer power from the vehicle to the primary trailer or the primary trailer to the secondary trailer, and brake wiring that connect to electric brakes.

13. A trailer dolly apparatus comprising:

a dolly frame comprising:

a first fender coupled to a first side of the dolly frame and a second fender coupled to a second side of the dolly frame;

a plurality of corner supports;

a first bumper frame and a second bumper frame each coupled to a rear section, the first bumper frame extending upward and coupled to the first fender; the first bumper frame comprising a first arm, a second arm both spaced apart from each other and coupled to the dolly frame, a third arm perpendicular to and interposed between the first and second arms; the first arm, on a first rear surface, comprises a first section of padded material; and the second bumper frame extending upward and coupled to the second fender; the second bumper frame comprising a fourth arm, a fifth arm both spaced apart from each other and coupled to the dolly frame, a sixth arm perpendicular to and interposed between the fourth and fifth arms; the fourth arm, on a second rear surface, comprises a second section of padded material;

a tongue with a first member, a first support arm, and a second support arm, the first member comprising a sleeve;

an axle;

two ground engaging wheels;

an adjustable trailer hitch comprising a second member, the second member may be positioned in the first member and extend therefrom, the second member comprises a first finger and a second finger; the adjustable trailer hitch fastens to either a vehicle or a primary trailer, the adjustable trailer hitch comprising a bracket with a channel;

a towing receiver with a base that is positioned in the channel of the bracket and is adjustably coupleable thereto;

an adjustable ball hitch removably attachable to the sleeve for pivotally connecting a tongue hitch of the primary trailer or a secondary trailer to the trailer dolly apparatus;

a shock absorbing mechanism provided between the axle and the dolly frame to absorb shocks from the road;

an electronics system comprising tail lights on the first and second fenders, electrical cords that transfer power from the vehicle to the primary trailer or the primary trailer to the secondary trailer, and brake wiring that connect to electric brakes.

* * * * *